(12) United States Patent
Kong et al.

(10) Patent No.: US 12,491,879 B2
(45) Date of Patent: Dec. 9, 2025

(54) VEHICLE CRUISE TORQUE CONTROL METHOD AND APPARATUS

(71) Applicant: Shenzhen Yinwang Intelligent Technologies Co., Ltd., Guangdong (CN)

(72) Inventors: Guoling Kong, Shenzhen (CN); Xuan Long, Shenzhen (CN); Yongxiang Tao, Shanghai (CN); Jun Wang, Shenzhen (CN); Fulong Xin, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/932,925

(22) Filed: Sep. 16, 2022

(65) Prior Publication Data

US 2023/0009744 A1    Jan. 12, 2023

Related U.S. Application Data

(63) Continuation of application No. PCT/CN2021/079371, filed on Mar. 5, 2021.

(30) Foreign Application Priority Data

Mar. 18, 2020    (CN) .................. 202010191681.X (51) Int. Cl.
*B60W 30/14*    (2006.01)
*B60W 50/00*    (2006.01)

(52) U.S. Cl.
CPC .................. *B60W 30/143* (2013.01)

(58) Field of Classification Search
CPC .................................. B60W 30/143
See application file for complete search history.

(56) References Cited

U.S. PATENT DOCUMENTS

| | | | |
|---|---|---|---|
| 7,641,584 B1 * | 1/2010 | Belloso | B60K 5/08 477/6 |
| 10,131,227 B2 | 11/2018 | Johansson et al. | |
| 2010/0332100 A1 * | 12/2010 | Faggetter | B60K 31/00 701/93 |
| 2014/0067211 A1 * | 3/2014 | Kim | B60W 30/143 701/54 |
| 2014/0244083 A1 | 8/2014 | Kim | |
| 2016/0031443 A1 | 2/2016 | Komatsu et al. | |
| 2016/0159352 A1 * | 6/2016 | Kim | B60W 30/143 701/93 |
| 2019/0100208 A1 * | 4/2019 | Plianos | F02D 29/02 |

FOREIGN PATENT DOCUMENTS

| | | |
|---|---|---|
| CN | 101624016 A | 1/2010 |
| CN | 103661377 A | 3/2014 |
| CN | 104015720 A | 9/2014 |
| CN | 104192145 A | 12/2014 |

(Continued)

*Primary Examiner* — Scott A Browne
*Assistant Examiner* — Rami Nabih Bedewi
(74) *Attorney, Agent, or Firm* — WOMBLE BOND DICKINSON (US) LLP (57) ABSTRACT

A vehicle cruise control method and apparatus related to the technical field of vehicle manufacturing are provided. The method resolves a problem of relatively large energy consumption during vehicle cruise control.

9 Claims, 4 Drawing Sheets

(56) References Cited

FOREIGN PATENT DOCUMENTS

| | | | |
|---|---|---|---|
| CN | 104340066 | A | 2/2015 |
| CN | 105346390 | A | 2/2016 |
| CN | 106740814 | A | 5/2017 |
| CN | 107487324 | A | 12/2017 |
| CN | 107745712 | A | 3/2018 |
| CN | 108275142 | A | 7/2018 |
| CN | 109050532 | A | 12/2018 |
| CN | 109415062 | A | 3/2019 |
| CN | 109484405 | A | 3/2019 |
| CN | 109552329 | A | 4/2019 |
| CN | 109591595 | A | 4/2019 |
| CN | 109624979 | A | 4/2019 |
| CN | 109835335 | A | 6/2019 |
| CN | 110155051 | A | 8/2019 |
| DE | 102007036794 | A1 | 2/2009 |
| DE | 102014226296 | A1 | 1/2016 |
| EP | 2709889 | B1 | 10/2020 |
| JP | H08113056 | A | 5/1996 |
| JP | 2009018681 | A | 1/2009 |
| WO | 2013065167 | A1 | 5/2013 |

\* cited by examiner

VEHICLE CRUISE TORQUE CONTROL METHOD AND APPARATUS

CROSS-REFERENCE TO RELATED APPLICATIONS

This application is a continuation of International Patent Application No. PCT/CN2021/079371, filed on Mar. 5, 2021, which claims priority to Chinese Patent Application No. 202010191681.X, filed on Mar. 18, 2020. The disclosures of the aforementioned applications are hereby incorporated by reference in their entireties.

TECHNICAL FIELD

This application relates to the technical field of vehicle manufacturing, furthermore, to a vehicle cruise control method and an apparatus.

BACKGROUND

A driver may control driving of a vehicle by using a cruise control (CC) system. In this case, the driver may enable the vehicle to automatically drive at a fixed speed without stepping on a throttle or a brake pedal. In this way, the driver does not need to control the throttle and the brake pedal, thereby effectively alleviating the driver's driving fatigue.

Currently, when a traditional cruise control method is used for cruise control, acceleration or deceleration is frequently performed to enable a vehicle to drive at a fixed speed, leading to relatively large energy consumption. Therefore, how to reduce energy consumption of a vehicle during vehicle cruise control is an urgent technical problem to be resolved.

SUMMARY

This application provides a vehicle cruise control method and apparatus, to resolve a problem of relatively large energy consumption during vehicle cruise control.

To achieve the objectives, this application provides the following technical solutions.

According to a first aspect, this application provides a vehicle cruise control method, and the method is applied to a vehicle control system. The method includes: obtaining an actual vehicle speed of a vehicle at a current moment; determining whether the actual vehicle speed at the current moment is within a target range, where the target range is determined based on a tolerance range of a target vehicle speed of the vehicle, and the tolerance range is a range of allowed fluctuations of the target vehicle speed; if the determining result is yes, controlling the vehicle to cruise at a target value of a cruising torque, where the cruising torque is a torque output by an engine of the vehicle from a crankshaft end; if the determining result is no, adjusting the target value to control an actual vehicle speed of the vehicle at a first moment to be within the target range, where the first moment is any moment after the current moment.

In this way, the vehicle is controlled to cruise within the target range (that is, a speed range) at the predetermined target value (which may be understood as a fixed torque) of the cruising torque. Compared with a traditional cruise control technology, frequent accelerations and decelerations are avoided, thereby reducing energy consumption of the vehicle and increasing an endurance mileage of the vehicle.

With reference to the first aspect, in an embodiment, the target range is determined based on the tolerance range of the target vehicle speed and a speed limit range of a road on which the vehicle is located. When the target range of the vehicle speed is determined, the speed limit range of the road on which the vehicle is located is considered. In this way, an overspeed violation of the vehicle during cruise control is avoided.

With reference to the first aspect, in an embodiment, the target value is a value of a cruising torque at which the vehicle drives on a flat road. In this way, when encountering a road condition with a relatively small ramp, the vehicle does not need to accelerate or decelerate, thereby reducing energy consumption and increasing the endurance mileage.

With reference to the first aspect, in another embodiment, before the "obtaining an actual vehicle speed of a vehicle at a current moment", the method further includes: determining the target value of the cruising torque based on a feedforward torque and a feedback torque. The feedforward torque and the feedback torque are respectively a feedforward torque and a feedback torque of the vehicle control system when a cruise control duration reaches a preset duration in a process in which the vehicle control system controls the vehicle to cruise at the target vehicle speed. Alternatively, the feedforward torque and the feedback torque are respectively a feedforward torque and a feedback torque of the vehicle control system when an actual vehicle speed of the vehicle reaches the target vehicle speed in a process in which the vehicle control system controls the vehicle to cruise at the target vehicle speed. The feedforward torque includes at least one of a gradient resistance torque, a rolling resistance torque, and a wind resistance torque. The feedback torque includes a torque required for adjusting the actual vehicle speed to the target vehicle speed. In this way, the target value of the cruising torque is determined by using the cruise control method, thereby improving robustness of an algorithm for determining the target value of the cruising torque.

According to a second aspect, this application provides a vehicle cruise control apparatus.

In an embodiment, the vehicle cruise control apparatus is configured to perform any method provided in the first aspect. In this application, functional module division may be performed on the vehicle cruise control apparatus according to any method provided in the first aspect. For example, each functional module may be divided for each function, or two or more functions may be integrated into one processing module. For example, in this application, the vehicle cruise control apparatus may be divided into an obtaining unit, a judging unit, a control unit, and the like based on functions. For descriptions of technical solutions performed by the foregoing functional modules obtained through division and beneficial effects achieved, refer to the technical solutions provided in the first aspect or corresponding embodiments of the first aspect. Details are not described herein again.

In another embodiment, the vehicle cruise control apparatus includes a memory and one or more processors, and the memory is coupled to the processors. The memory is configured to store computer instructions. The processor is configured to invoke the computer instructions, to perform any method according to any one of the first aspect or the embodiments of the first aspect.

According to a third aspect, this application provides a computer-readable storage medium, for example, a non-transient computer-readable storage medium. The computer-readable storage medium stores a computer program (or instructions). When the computer program (or instructions)

is run on a computer, the computer is enabled to perform any method provided in any one of the embodiments according to the first aspect.

According to a fourth aspect, this application provides a computer program product. When the computer program product is run on a computer, any method provided in any one of the embodiments according to the first aspect is performed.

According to a fifth aspect, a chip system is provided and includes a processor. The processor is configured to invoke, from a memory, a computer program stored in the memory and run the computer program, to perform any method provided in the implementations according to the first aspect.

It may be understood that any one of the apparatus, the computer storage medium, the computer program product, the chip system, or the like provided above may be applied to a corresponding method provided above. Therefore, for beneficial effects that can be achieved, refer to the beneficial effects of the corresponding method. Details are not described herein again.

In this application, a name of the vehicle cruise control apparatus does not constitute a limitation on devices or functional modules. In actual implementation, these devices or functional modules may appear with other names. Each device or functional module falls within the scope defined by the claims and their equivalent technologies in this application, provided that a function of the device or functional module is similar to that described in this application.

These aspects or other aspects in this application are more concise and comprehensible in the following descriptions.

DESCRIPTION OF EMBODIMENTS

The following describes some terms or technologies in embodiments of this application.
(1) Cruise Control The cruise control allows a vehicle to automatically drive at a fixed speed. Once the vehicle is set to a cruise state, a fuel delivery volume/power supply volume of an engine is controlled by a processor. The processor may adjust the fuel delivery volume/power supply volume based on a road condition and driving resistance of the vehicle, so that the vehicle keeps driving at a specified speed without manipulating a throttle or a brake pedal.

(2) Vehicle Cruise

The vehicle cruise indicates that a vehicle automatically drives at a certain speed.
(3) Torque The torque of a vehicle refers to a torque output by an engine from a crankshaft end. The international unit is N m. At constant power, the torque of the vehicle is inversely proportional to a rotational speed of the engine. That is, a faster rotational speed indicates a smaller torque, and a slower rotational speed indicates a larger torque.
(4) Other Terms In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "for example" or "example" or the like is intended to present a relative concept in a specific manner.

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise stated, "a plurality of" means two or more than two.

This application provides a vehicle cruise control method and apparatus, to effectively reduce energy consumption during a vehicle cruise. The method includes: determining whether a current vehicle speed exceeds a target range during a vehicle cruise; if the current vehicle speed is within the target range, controlling the vehicle to cruise at a predetermined target value of a cruising torque; and if the current vehicle speed exceeds the target range, adjusting the target value, so that a vehicle speed after a current moment is within the target range. In this way, when an actual vehicle speed of the vehicle is within the target range, the vehicle does not need to frequently accelerate or decelerate, thereby reducing energy consumption and increasing a cruising range.

An embodiment of this application provides a vehicle control system 10. The vehicle cruise control method may be applied to the vehicle control system 10.

Figure 1:
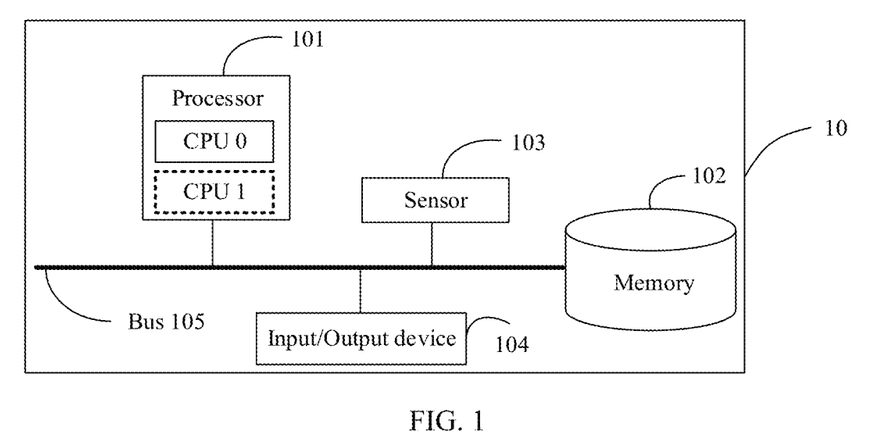
FIG. 1 is a schematic structural diagram of a vehicle control system according to an embodiment of this application.

FIG. 1 shows a hardware structure of the vehicle control system 10. The vehicle control system 10 includes a processor 101, a memory 102, a sensor 103, an input/output device 104, and a bus 105. The processor 101, the memory 102, the sensor 103, and the input/output device 104 may be connected through the bus 105.

The processor 101 is a control center of the vehicle control system 10, and may be a general-purpose central processing unit (CPU), another general-purpose processor, or the like. The general-purpose processor may be a microprocessor, any conventional processor, or the like.

In an example, the processor 101 may include one or more CPUs, for example, a CPU 0 and a CPU 1 shown in FIG. 1.

The memory 102 may be a read-only memory (ROM) or another type of static storage device capable of storing static information and instructions, a random access memory (RAM) or another type of dynamic storage device capable of storing information and instructions, an electrically erasable programmable read-only memory (EEPROM), a magnetic disk storage medium or another magnetic storage device, or any other medium capable of carrying or storing expected program code in a form of an instruction or data structure and capable of being accessed by a computer, but is not limited thereto.

In an embodiment, the memory 102 may be independent of the processor 101. The memory 102 may be connected to the processor 101 through the bus 105, and is configured to store data, instructions, or program code. When the processor 101 invokes and executes the instructions or the program code stored in the memory 102, the processor 101 may implement the vehicle cruise control method provided in embodiments of this application.

In another embodiment, the memory 102 may alternatively be integrated with the processor 101.

The sensor 103 includes a speed sensor and an acceleration sensor.

The speed sensor is a sensor used to measure a vehicle speed. The speed sensor includes a linear velocity sensor and an angular velocity sensor. The speed sensor in this embodiment of this application may be a linear velocity sensor.

The acceleration sensor is a sensor configured to measure an acceleration. The acceleration sensor generally includes a mass block, a damper shock absorber, an elastic element, a sensible element, an adaptive circuit, and the like. According to different sensible elements of sensors, common acceleration sensors include capacitive, inductive, strain, piezoresistive, or piezoelectric acceleration sensors.

The input/output device 104 is configured to input parameter information such as a target vehicle speed and a tolerance range, so that the processor 101 executes the instructions in the memory 102 based on the input parameter information, to control a vehicle cruise and the like. Generally, the input/output device 104 may be an operating panel, a touchscreen, or any other device on which parameter information can be input. This is not limited in embodiments of this application.

The bus 105 may be an industry standard architecture (ISA) bus, a peripheral component interconnect (PCI) bus, an extended industry standard architecture (EISA) bus, or the like. The bus may be classified into an address bus, a data bus, a control bus, and the like. For the convenience of representation, only one bold line is used for representation in FIG. 1, but it does not represent that there is only one bus or one type of bus.

It should be noted that the structure shown in FIG. 1 does not constitute a limitation on the vehicle control system 10. In addition to the components shown in FIG. 1, the vehicle control system 10 may include more or fewer components than those shown in the figure, or have some components combined, or have different component layouts.

The following describes the method provided in this embodiment of this application with reference to the accompanying drawings.

The vehicle cruise control method provided in this embodiment of this application includes a process of determining/obtaining a target value of a cruising torque and determining a target range of a vehicle speed, and a process of controlling a vehicle to cruise at the target value of the cruising torque.

In some embodiments, in embodiments of this application, a vehicle control system may control the vehicle to cruise at the target vehicle speed, to determine the target value of the cruising torque. Certainly, the target value of the cruising torque may alternatively be preset by the system. In this case, the processor may obtain the target value of the cruising torque from the vehicle control system. Alternatively, the processor may obtain the target value of the cruising torque that is input by a driver through the input/output interface. Alternatively, the processor may obtain the target value of the cruising torque in any other manner. This is not limited in embodiments of this application.

The following describes a process in which the vehicle control system controls the vehicle to cruise at the target vehicle speed to determine the target value of the cruising torque and the target range of the vehicle speed. For ease of clear description, "target value of the cruising torque" is referred to as a target cruising torque in the following.

Figure 2:
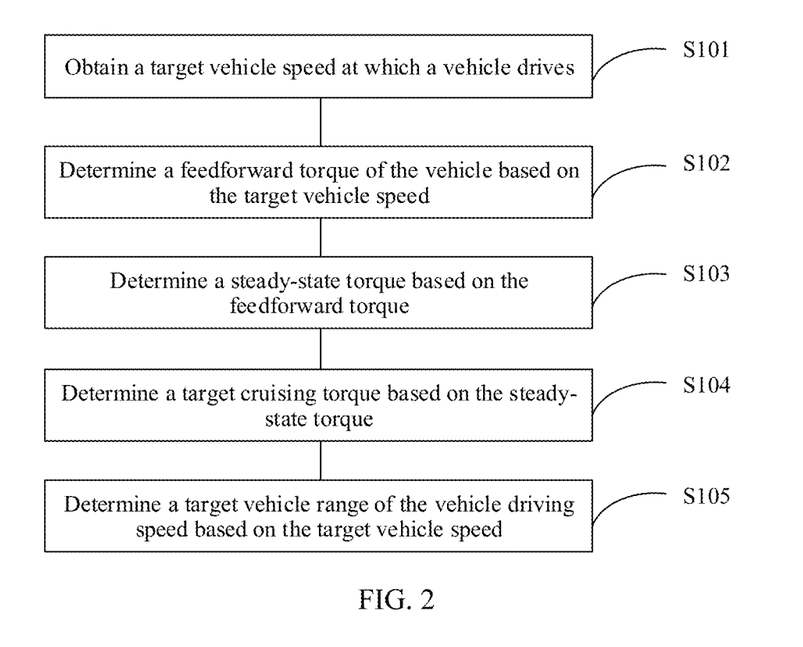
FIG. 2 is a schematic flowchart 1 of a vehicle cruise control method according to an embodiment of this application.

FIG. 2 is a schematic flowchart of controlling a vehicle to cruise at a target vehicle speed through a vehicle control system to determine a target cruising torque and a target range of the vehicle speed according to an embodiment of this application. The procedure includes the following.

S101. A processor obtains a target vehicle speed at which a vehicle drives.

The target vehicle speed at which the vehicle drives may be a vehicle speed input by a driver through an input/output device (for example, a touchscreen or an operating panel). For example, the driver may enter "60 km/h" on the touchscreen. In response to the operation, the processor uses the received vehicle speed of "60 km/h" as the target vehicle speed at which the vehicle drives. Alternatively, the target vehicle speed at which the vehicle drives may be preset in a vehicle control system. This is not limited in embodiments of this application.

S102. The processor determines a feedforward torque of the vehicle based on the target vehicle speed.

Herein, the feedforward torque may include at least one of a rolling resistance torque, a wind resistance torque, and a gradient resistance torque. The rolling resistance torque represents a driving resistance torque formed between tires and a road surface when the vehicle drives, the wind resistance torque represents a driving resistance torque formed between a vehicle body and air when the vehicle drives, and the gradient resistance torque represents a resistance torque generated by a ramp for driving of the vehicle.

In some embodiments, the rolling resistance torque may be calculated by using formula (1):

$$T_f = MgfR, \text{ where} \tag{1}$$

$T_f$ represents the rolling resistance torque, Mg represents a load gravity, f represents a rolling resistance coefficient, and R represents a wheel radius.

The wind resistance torque may be calculated by using formula (2):

$$T_w = \frac{C_D A}{21.15} V^2 R, \tag{2}$$

where $T_w$ represents the wind resistance torque, $C_D$ represents a wind resistance coefficient, A represents a frontal area, V represents the target vehicle speed, and R represents the wheel radius.

The gradient resistance torque may be calculated by using formula (3):

$$T_s = M(a-\dot{v})R, \text{ where} \tag{3}$$

$T_s$ represents the gradient resistance torque, M represents a vehicle mass, a represents a longitudinal acceleration measured by an acceleration sensor, $\dot{v}$ represents a longitudinal acceleration obtained by performing a differential calculation on an actual vehicle speed, and R represents the wheel radius. Herein, the actual vehicle speed at which the vehicle drives may be measured by using a speed sensor. The speed sensor sends the measured actual vehicle speed to the processor. Correspondingly, the processor receives the actual vehicle speed sent by the speed sensor. It may be understood that the speed sensor may measure the actual vehicle speed at which the vehicle drives in real time, and send the measured actual vehicle speed to the processor in real time.

In an example, the rolling resistance torque, the wind resistance torque, and the gradient resistance torque are summed up to obtain the feedforward torque.

S103. The processor determines a steady-state torque based on the feedforward torque.

The processor obtains the feedforward torque to control an actual vehicle speed at which the vehicle cruises. The actual vehicle speed is usually different from the target vehicle speed obtained by the processor. For details on obtaining the feedforward torque to control an actual vehicle speed at which the vehicle cruises, refer to the description of obtaining the actual vehicle speed through operation S102. Details are not described herein again.

For example, when the target vehicle speed is 60 km/h, the actual vehicle speed at which the vehicle is controlled to drive based on the feedforward torque may be 50 km/h, or may be 70 km/h.

In this case, the processor triggers adjustment of the feedback torque, and controls the vehicle based on both the feedforward torque and the feedback torque. By doing so, the actual vehicle speed at which the vehicle is controlled to drive based on both the feedforward torque and the feedback torque is the same as the target vehicle speed. For example, the feedback torque may be adjusted by using a calibration algorithm (for example, a proportion integral differential algorithm, namely, a PID algorithm).

The PID algorithm may be used to calculate the feedback torque based on the actual vehicle speed and the target vehicle speed. It may be understood that frequency of updating the feedback torque may be the same as frequency of updating the actual vehicle speed by the speed sensor. In other words, the feedback torque may be updated in real time.

In an embodiment, after the vehicle is controlled to drive for a preset duration (for example, 5 s) based on both the feedback torque that is calculated by using the PID algorithm and the feedforward torque, the processor determines an accumulated torque of the feedback torque (corresponding to the feedback torque in the embodiment of this application) obtained when the preset duration ends and the feedforward torque as the steady-state torque. After the preset duration, the actual vehicle speed at which the vehicle is controlled to drive based on both the feedback torque calculated by using the PID algorithm and the feedforward torque is usually the same as the target vehicle speed. The preset duration is preset in the vehicle control system. The preset duration may be obtained through an experiment test or based on experience. This is not limited in this embodiment of this application.

In another possible implementation, when the actual vehicle speed at which the vehicle is controlled to drive based on both the feedback torque calculated by using the PID algorithm and the feedforward torque is the same as the target vehicle speed for the first time, the processor may determine an accumulated torque of the feedback torque (corresponding to the feedback torque in embodiments of this application) and the feedforward torque used to control the vehicle to drive at this moment as the steady-state torque.

For example, at a moment 1, the processor obtains an actual vehicle speed v1 at which the vehicle is controlled to drive based on the feedforward torque. Based on the v1 and the target vehicle speed, the processor calculates a feedback torque 1 by using the PID algorithm. The feedback torque 1 is used to control cruise of the vehicle at a moment 2 together with the feedforward torque. Herein, the moment 2 is a next moment of the moment 1.

At the moment 2, the processor obtains an actual vehicle speed v2 at which the vehicle is controlled to cruise based on both the feedback torque 1 and the feedforward torque. If the v2 is the same as the target vehicle speed, an accumulated torque of the feedback torque 1 and the feedforward torque is determined as the steady-state torque. If the v2 is different from the target vehicle speed, the processor calculates a feedback torque 2 by using the PID algorithm based on the actual vehicle speed v2 at the moment 2 and the target vehicle speed. The feedback torque 2 is used to control cruise of the vehicle at a moment 3 together with the feedforward torque. Herein, the moment 3 is a next moment of the moment 2.

At the moment 3, the processor obtains an actual vehicle speed v3 at which the vehicle is controlled to cruise based on both the feedback torque 2 and the feedforward torque, and determines whether the v3 is the same as the target vehicle speed. The preceding operations are performed until the actual vehicle speed at which the vehicle is controlled to cruise based on the feedback torque and the feedforward torque is the same as the target vehicle speed. The processor determines an accumulated torque of the feedback torque and the feedforward torque that is used to obtain the actual vehicle speed, which is the same as the target vehicle speed, as the steady-state torque.

S104. The processor determines a target cruising torque based on the steady-state torque.

The target cruising torque, that is, a target value of the cruising torque, is a value of the cruising torque at which the vehicle drives on a flat road. Herein, the flat road may be a road that does not include gradient information, or may be a road on which a vehicle longitudinal acceleration is 0.

The target cruising torque is used to control the vehicle to cruise within the target range. For a process of controlling the vehicle to cruise at the target cruising torque within the target range, refer to the following descriptions. Details are not described herein again.

In some embodiments, the processor may subtract the gradient resistance torque determined through operation S103 from the steady-state torque determined through operation S104, to obtain the target cruising torque.

In some embodiments, if the feedforward torque through operation S103 does not include a gradient resistance torque, the processor first calculates the gradient resistance torque based on the formula (3). Then, the processor subtracts the calculated gradient resistance torque from the steady-state torque determined through operation S104, to obtain the target cruising torque.

S105. The processor determines a target range of the vehicle driving speed based on the target vehicle speed.

In some embodiments, the processor determines the target range of the vehicle driving speed based on the target vehicle speed and a tolerance range of the target vehicle speed.

In some embodiments, the processor determines the target range of the vehicle driving speed based on the target vehicle speed, a tolerance range of the target vehicle speed, and a speed limit range of a road on which the vehicle is located.

The tolerance range of the target vehicle speed is a range in which the target vehicle speed fluctuates up and down. For example, if the tolerance range is "±5 km/h", it indicates that the target vehicle speed may fluctuate in a range from (target vehicle speed −5 km/h) to (target vehicle speed+5 km/h). Herein, the tolerance range of the target vehicle speed may be input by a driver through an input/output device (for example, a touchscreen or an operating panel), or may be selected from a plurality of preset tolerance ranges of target vehicle speeds in the system. This is not limited in embodiments of this application.

The processor may determine, based on the target vehicle speed and the tolerance range, a range in which the target vehicle speed fluctuates up and down. Then, the processor determines an intersection of the range and the speed limit range of the road on which the vehicle is located as the target range of the vehicle driving speed.

For example, if the target vehicle speed is 60 km/h and the tolerance range is "±5 km/h", the range of the target vehicle speed fluctuations determined by the processor based on the target vehicle speed and the tolerance range is "55-65 km/h". If the speed limit range of the road on which the vehicle is located is "0-70 km/h", the processor determines the intersection "55-60 km/h" of "55-65 km/h" and "0-70 km/h" as the target vehicle driving speed range. If the speed limit range of the road on which the vehicle is located is "0-60 km/h", the processor determines the intersection "55-60 km/h" of "55-65 km/h" and "0-60 km/h" as the target vehicle driving speed range.

Certainly, the processor may alternatively receive a vehicle driving speed range that is input by a driver through an input/output device (for example, a touchscreen or an operating panel). This speed range is determined as the target range of the vehicle driving speed. For example, the driver inputs "55-65 km/h" through a touchscreen. In response to the operation, the processor determines the received speed range 55-65 km/h as the target range of the vehicle driving speed. Alternatively, the target range of the vehicle driving speed may be a vehicle speed range selected by the driver from a plurality of vehicle speed range options on the touchscreen. The processor uses the selected vehicle speed range as the target range of the vehicle driving speed. This is not limited in embodiments of this application. In this case, the target vehicle speed may be an average vehicle speed in the target range, or the target vehicle speed may be any vehicle speed in the target range. This is not limited in embodiments of this application.

It should be noted that a sequence of performing operations S102 to S104 and operation S105 is not limited in this embodiment of this application. For example, operations S102 to S104 and operation S105 may be simultaneously performed, or operations S102 to S104 may be performed before operation S105.

The procedure for obtaining the target cruising torque by the processor is described above. The following describes a procedure in which the processor controls a vehicle to cruise at the target cruising torque.

Figure 3:
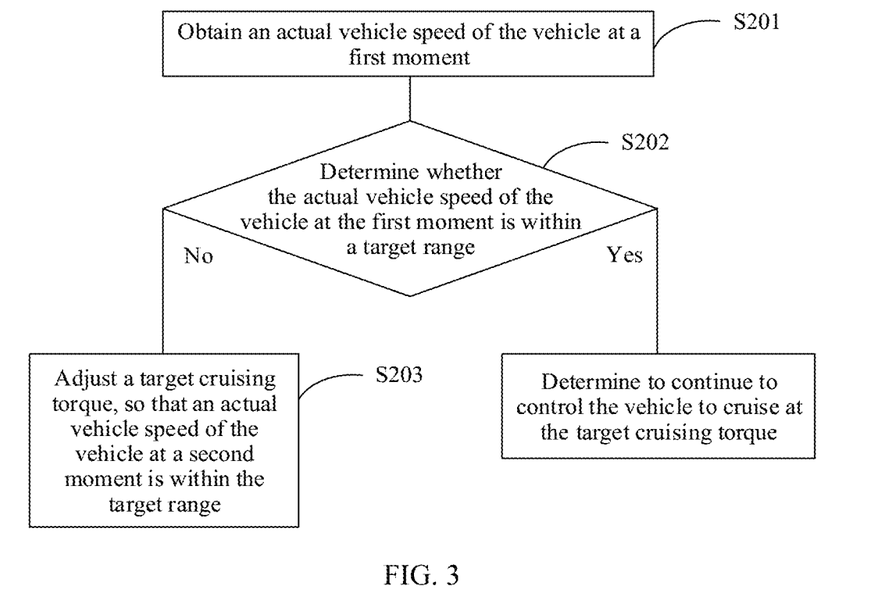
FIG. 3 is a schematic flowchart 2 of a vehicle cruise control method according to an embodiment of this application.

FIG. 3 is a schematic flowchart of controlling a vehicle to cruise at a target cruising torque according to an embodiment of this application. The procedure includes the following operations.

S201. A processor obtains an actual vehicle speed of a vehicle at a first moment (corresponding to a current moment in this embodiment of this application).

The processor controls the vehicle to cruise at the target cruising torque that is determined through operations S101 to S105. When the vehicle is cruising, the processor obtains the actual vehicle speed of the vehicle at the first moment.

For the process in which the processor obtains the actual vehicle speed at the first moment, refer to the description of obtaining the actual vehicle speed through operation S102. Details are not described herein again.

S202. The processor determines whether the actual vehicle speed of the vehicle at the first moment is within a target range.

If the determining result is yes, the processor determines to continue to control the vehicle to cruise at the target cruising torque.

If the determining result is no, the processor performs operation S203.

S203. The processor adjusts the target cruising torque, so that an actual vehicle speed of the vehicle at a second moment falls within the target range.

The second moment may be any moment after the first moment. For example, the second moment may be a next moment of the first moment.

The processor adjusts the target cruising torque based on the target range and the actual vehicle speed of the vehicle at the first moment, so that the actual vehicle speed of the vehicle at the second moment falls within the target range.

In some embodiments, the processor may trigger adjustment of a feedback torque to adjust the target cruising torque. The feedback torque may be a feedback torque calculated by using a PID algorithm based on the target range and the actual vehicle speed of the vehicle at the first moment. Further, the processor uses the feedback torque and the target cruising torque as an adjusted target cruising torque, and controls the vehicle to cruise at the adjusted target cruising torque, so that the actual vehicle speed falls within the target range.

Based on the actual vehicle speed and the target range, the feedback torque may be calculated by using a PID algorithm. It may be understood that because the actual vehicle speed may be obtained in real time, the feedback torque may be updated in real time.

For example, the processor calculates a feedback torque 1 by using the PID algorithm based on an actual vehicle speed v1 at a moment 1 and the target range. The vehicle is controlled to drive at an actual vehicle speed v2 at a moment 2 based on both the feedback torque 1 and the target cruising torque. Herein, the moment 2 is a next moment of the moment 1.

If the v2 is within the target range, the processor determines an accumulated torque of the feedback torque 1 and the target cruising torque as the adjusted target cruising torque, based on which the processor controls the vehicle to cruise.

If the v2 is not within the target range, the processor calculates a feedback torque 2 by using the PID algorithm based on the actual vehicle speed v2 at the moment 2 and the target vehicle speed. An actual vehicle speed of the vehicle at a next moment of the moment 2 is controlled based on both the feedback torque 2 and the target cruising torque. Further, the processor determines whether the actual vehicle speed at the next moment of the moment 2 falls within the target range. The preceding operations are performed until the actual vehicle speed controlled based on both the feedback torque calculated based on the actual vehicle speed at each moment and the target range and the target cruising torque is within the target range. The processor uses an accumulated torque of the feedback torque and the target cruising torque when the actual vehicle speed is controlled to fall within the target range as the adjusted target cruising torque. The processor controls the vehicle to cruise at the adjusted target cruising torque.

It may be understood that when the actual vehicle speed at which the vehicle drives is less than the target range, the determined adjusted target cruising torque may be positive. When the actual vehicle speed at which the vehicle drives is greater than the target range, the determined adjusted target cruising torque may be negative.

It can be learned from the foregoing descriptions that, in this embodiment of this application, before the vehicle is controlled to cruise at the target cruising torque, the vehicle control system may first control the vehicle to cruise at the target vehicle speed, and determine the target cruising torque via cruise control. Then, the target cruising torque is used to control the vehicle to cruise within the target range.

In other words, in this embodiment of this application, steady-state torque under conditions such as different road conditions, different load capacities, and different vehicle cruising speeds is identified by using the cruise control method. In this way, based on the steady-state torque, the target cruising torque to be used in the vehicle cruise control method provided in this embodiment of this application is determined. In this way, the robustness of the algorithm for determining the target cruising torque is improved.

Figure 4:
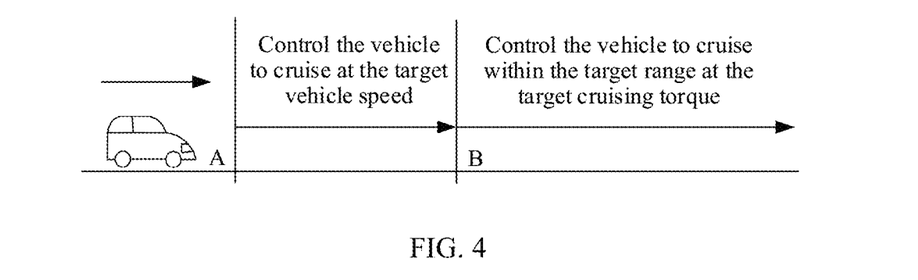
FIG. 4 is a schematic diagram of a vehicle cruise control method according to an embodiment of this application.

FIG. 4 shows an example of a relationship between a phase in which the vehicle is controlled to cruise at the target vehicle speed and a phase in which the vehicle is controlled to cruise within the target range at the target cruising torque. As shown in FIG. 4, the vehicle shown in FIG. 4 drives in a direction pointed by arrows. A segment AB shown in FIG. 4 represents the phase in which the vehicle is controlled to cruise at the target vehicle speed, and a segment after the point B in FIG. 4 represents the phase in which the vehicle is controlled to cruise within the target range at the target cruising torque. The driving duration of the vehicle in the segment AB may be the preset duration through operation S104, or may be a duration for the actual vehicle speed of the vehicle to reach the target vehicle speed. This is not limited in this embodiment of this application.

In conclusion, this embodiment of this application provides a vehicle cruise control method, to control the vehicle to cruise within the target range at the determined target cruising torque. If the actual vehicle cruising speed that is controlled based on the target cruising torque falls within the target range, the target cruising torque is continuously used for vehicle cruise control. If the actual vehicle cruising speed that is controlled based on the target cruising torque is not within the target range, the target cruising torque is adjusted to control the actual vehicle speed at which the vehicle cruises to be within the target range. In this way, when a vehicle speed is within the target range, the vehicle does not need to frequently accelerate or decelerate, thereby saving energy consumption and increasing endurance mileage.

In addition, because the target cruising torque is a torque for a vehicle to cruise at a fixed speed on a flat road, when the road surface gradient is relatively small, the processor does not need to control the vehicle to accelerate or decelerate, thereby reducing energy consumption and increasing endurance mileage.

The foregoing mainly describes the solutions provided in embodiments of this application from the perspective of the methods. To implement the foregoing functions, corresponding hardware structures and/or software modules for performing the functions are included. A person skilled in the art should easily be aware that, in combination with units and algorithm operations of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the vehicle cruise control apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 5:
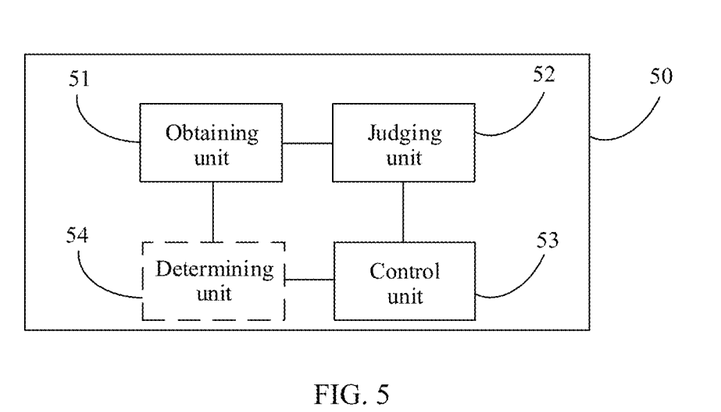
FIG. 5 is a schematic structural diagram of a vehicle cruise control apparatus according to an embodiment of this application.

FIG. 5 is a schematic structural diagram of a vehicle cruise control apparatus 50 according to an embodiment of this application. The vehicle cruise control apparatus 50 is configured to control a vehicle to cruise within a target vehicle speed range. In addition, the apparatus is also configured to perform the foregoing vehicle cruise control methods, for example, the methods shown in FIG. 2 and FIG. 3. The vehicle cruise control apparatus 50 may include an obtaining unit 51, a judging unit 52, and a control unit 53.

The obtaining unit 51 is configured to obtain an actual vehicle speed of the vehicle at a current moment. The judging unit 52 is configured to determine whether the actual vehicle speed at the current moment is within the target range. The target range is determined based on a tolerance range of a target vehicle speed. The tolerance range is a range for allowed fluctuations of the target vehicle speed. The control unit 53 is configured to control the vehicle to cruise at the target value of the cruising torque when a determining result of the judging unit 52 is yes. Herein, the cruising torque is a torque output from the crankshaft end of the vehicle engine. The control unit 53 is further configured to adjust the target value to control an actual vehicle speed of the vehicle at a first moment to be within the target range when a determining result of the judging unit 52 is no. Herein, the first moment is any moment after the current moment.

For example, with reference to FIG. 3, the obtaining unit 51 may be configured to perform operation S201, the judging unit 52 may be configured to perform operation S202, and the control unit 53 may be configured to perform operation S203.

In some embodiments, the target range is determined based on the tolerance range of the target vehicle speed and a speed limit range of a road on which the vehicle is located.

In some embodiments, the target value is a value of a cruising torque used by the vehicle to drive on a flat road.

In some embodiments, the vehicle cruise control apparatus 50 may further include a determining unit 54.

The determining unit 54 is configured to determine the target value of the cruising torque based on the feedforward torque and the feedback torque before the operation of "obtaining an actual vehicle speed of the vehicle at a current moment". The feedforward torque and the feedback torque may respectively be a feedforward torque and a feedback torque of the vehicle control system when a cruise control duration reaches a preset duration in a process in which the vehicle control system controls the vehicle to cruise at the target vehicle speed. Alternatively, the feedforward torque and the feedback torque are respectively a feedforward torque and a feedback torque of the vehicle control system when an actual vehicle speed of the vehicle reaches the target vehicle speed in a process in which the vehicle control system controls the vehicle to cruise at the target vehicle speed. The feedforward torque may include at least one of a gradient resistance torque, a rolling resistance torque, and a wind resistance torque. The feedback torque may include a torque required for adjusting the actual vehicle speed to the target vehicle speed.

For example, with reference to FIG. 2, the determining unit 54 may be configured to perform operations S102 and S104.

For specific descriptions of the foregoing optional manners, refer to the foregoing method embodiments. Details are not described herein again. In addition, for explanations of any vehicle cruise control apparatus 50 provided and descriptions of beneficial effects, refer to the foregoing method embodiments. Details are not described again.

As an example, with reference to FIG. 1, the obtaining unit 51 in the vehicle cruise control apparatus 50 may be implemented by the input/output device 104 in FIG. 1. To implement functions implemented by the judging unit 52, the control unit 53, and the determining unit 54, the processor 101 in FIG. 1 may execute the program code in the memory 102 in FIG. 1.

Figure 6:
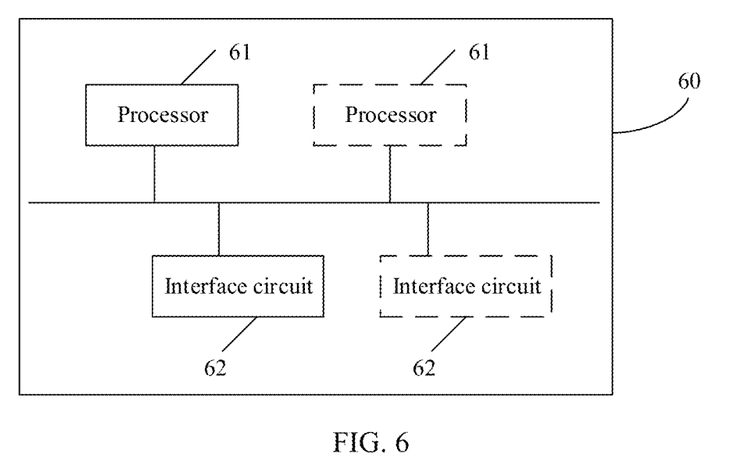
FIG. 6 is a schematic structural diagram of a chip system according to an embodiment of this application.

An embodiment of this application further provides a chip system 60. As shown in FIG. 6, the chip system 60 includes at least one processor 61 and at least one interface circuit 62. The processor 61 and the interface circuit 62 may be interconnected through a line. For example, the interface circuit 62 may be configured to receive a signal (for example, receive a signal from a sensor or an input/output device). For another example, the interface circuit 62 may be configured to send a signal to another apparatus (for example, the processor 61). For example, the interface circuit 62 may read instructions stored in a memory, and send the instructions to the processor 61. When the instructions are executed by the processor 61, the vehicle cruise control apparatus may be enabled to perform the operations in the foregoing embodiment. Certainly, the chip system 60 may further include another discrete device. This is not limited in this embodiment of this application.

Another embodiment of this application further provides a computer-readable storage medium. The computer-readable storage medium stores instructions. When the instructions are run on a vehicle cruise control apparatus, the vehicle cruise control apparatus performs the operations performed by the vehicle cruise control apparatus in the method process shown in the foregoing method embodiment.

In some embodiments, the disclosed methods may be implemented as computer program instructions encoded in a machine-readable format on a computer-readable storage medium or encoded on another non-transitory medium or product.

Figure 7:
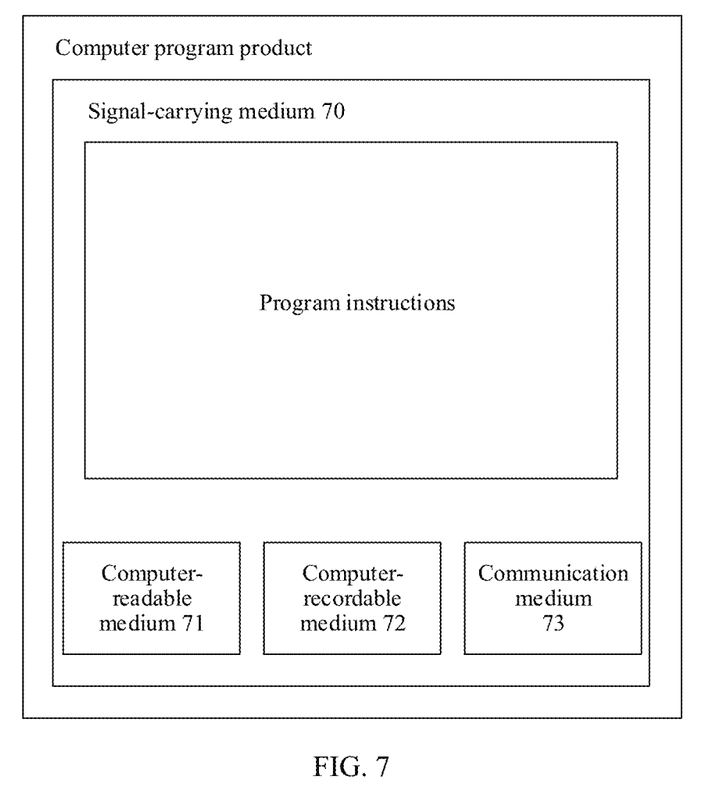
FIG. 7 is a schematic structural diagram of a computer program product according to an embodiment of this application.

FIG. 7 schematically shows a conceptual partial view of a computer program product according to an embodiment of this application. The computer program product includes a computer program used to execute a computer process on a computing device.

In an embodiment, the computer program product is provided via a signal-carrying medium 70. The signal-carrying medium 70 may include one or more program instructions. When the program instructions are run by one or more processors, the functions or some of the functions described in FIG. 2 or FIG. 3 may be provided. Therefore, for example, one or more features of operations S101 to S105 in FIG. 2 or operations S201 to S203 in FIG. 3 may be carried by one or more instructions associated with the signal-carrying medium 70. In addition, the program instructions in FIG. 7 are also described as example instructions.

In some examples, the signal-carrying medium 70 may include a computer-readable medium 71, for example, but not limited to, a hard disk drive, a compact disc (CD), a digital video disc (DVD), a digital tape, a memory, a read-only memory (ROM), or a random access memory (RAM).

In some implementations, the signal-carrying medium 70 may include a computer-recordable medium 72, for example, but not limited to, a memory, a read/write (R/W) CD, or an R/W DVD.

In some implementations, the signal-carrying medium 70 may include a communication medium 73, for example, but not limited to, a digital and/or analog communication medium (for example, an optical cable, a waveguide, a wired communication link, or a wireless communication link).

The signal-carrying medium 70 may be communicated with the communication medium 73 in a wireless form (for example, a wireless communication medium that complies with the IEEE 802.11 standard or another transport protocol). The one or more program instructions may be, for example, one or more computer-executable instructions or one or more logic implementation instructions.

In some examples, the vehicle cruise control apparatus described in FIG. 2 or FIG. 3 may be configured to provide various operations, functions, or actions in response to one or more program instructions in the computer-readable medium 71, the computer-recordable medium 72, and/or the communication medium 73.

It should be understood that the arrangement described herein is merely used as an example. Thus, a person skilled in the art appreciates that another arrangement and another element (for example, a machine, an interface, a function, a sequence, and a group of functions) can be used to replace the arrangement, and some elements may be omitted together depending on a desired result. In addition, many of the described elements are functional entities that can be implemented as discrete or distributed components, or implemented in any suitable combination at any suitable location in combination with another component.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer-executable instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical cable, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely embodiments of the present invention, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A vehicle cruise control method, applied to a vehicle control system controlling a vehicle, comprising:
   obtaining an actual vehicle speed of a vehicle at a current moment;
   determining whether the vehicle is operating in a first phase of cruising at a target vehicle speed or a second phase of cruising at a target cruising torque, the second phase intentionally allowing for speeds fluctuations for saving energy consumption of the vehicle; and
   in response to determining that the vehicle is operating in the second phase, further determining whether the actual vehicle speed at the current moment is within a target range, determined based on a tolerance range of the target vehicle speed of the vehicle; and
   in response to that the actual vehicle speed is within the target range, controlling the vehicle to cruise at a target value of a cruising torque that allows for the speeds fluctuations, wherein the cruising torque is a torque output by an engine of the vehicle from a crankshaft end, and wherein the target value of the cruising torque is determined based on a feedforward torque and a feedback torque, the feedback torque adjusted by a calibration algorithm; or
   in response to that the actual vehicle speed is not within the target range, adjusting the target value of the cruising torque to cause the actual vehicle speed of the vehicle, at a first moment after the current moment, to be within the target range, wherein the target value is determined before obtaining the actual vehicle speed of the vehicle at the current moment, and
   wherein the feedforward torque and the feedback torque are respectively: a feedforward torque and a feedback torque of the vehicle control system when a cruise control duration reaches a preset duration in a process in which the vehicle control system controls the vehicle to cruise at the target vehicle speed, the feedforward torque comprises at least one of a gradient resistance torque, a rolling resistance torque, and a wind resistance torque, and the feedback torque comprises a torque required for adjusting the actual vehicle speed to the target vehicle speed.

2. The method according to claim 1, wherein the target range is determined based on the tolerance range of the target vehicle speed and a speed limit range of a road on which the vehicle is located.

3. The method according to claim 2, wherein the target value is a value of a cruising torque at which the vehicle drives on a flat road.

4. A vehicle cruise control apparatus, used on a vehicle control system controlling a vehicle, comprising:
   at least one processor; and
   a memory coupled to the at least one processor and storing programming instructions for execution by the at least one processor, the programming instructions, when executed by the at least one processor, instruct the vehicle control system to perform the following operations:
   obtaining an actual vehicle speed of a vehicle at a current moment;
   determining whether the vehicle is operating in a first phase of cruising at a target vehicle speed or a second phase of cruising at a target cruising torque, the second phase intentionally allowing for speeds fluctuations for saving energy consumption of the vehicle; and
   in response to determining that the vehicle is operating in the second phase, further determining whether the actual vehicle speed at the current moment is within a target range determined based on a tolerance range of the target vehicle speed of the vehicle; and
   in response to that a determining result indicates that the actual vehicle speed is within the target range, control the vehicle to cruise at a target value of a cruising torque that allows for the speed fluctuations, wherein the cruising torque is a torque output by an engine of the vehicle from a crankshaft end, and wherein the target value of the cruising torque is determined based on a feedforward torque and a feedback torque, the feedback torque adjusted by a calibration algorithm; and
   in response to that a determining result indicates that the actual vehicle speed is not within the target range, adjust the target value of the cruising torque to cause the actual vehicle speed of the vehicle, at a first moment after the current moment, to be within the target range, wherein the feedforward torque and the feedback torque are respectively a feedforward torque and a feedback torque of the vehicle control system when a cruise control duration reaches a preset duration in a process in which the vehicle control system controls the vehicle to cruise at the target vehicle speed, wherein the feedforward torque comprises at least one of a gradient resistance torque, a rolling resistance torque, and a wind resistance torque, and the feedback torque comprises a torque required for adjusting the actual vehicle speed to the target vehicle speed.

5. The apparatus according to claim 4, wherein the target range is determined based on the tolerance range of the target vehicle speed and a speed limit range of a road on which the vehicle is located.

6. The apparatus according to claim 5, wherein the target value is a value of a cruising torque at which the vehicle drives on a flat road.

7. A computer program product storing computer-executable instructions stored on a non-transitory computer-readable storage medium that, when executed by a processor of a vehicle cruise control system controlling a vehicle, cause the vehicle cruise control system to:
   obtain an actual vehicle speed of a vehicle at a current moment;
   determine whether the vehicle is operating in a first phase of cruising at a target vehicle speed or a second phase of cruising at a target cruising torque, the second phase intentionally allowing for speeds fluctuations for saving energy consumption of the vehicle; and
   in response to determining that the vehicle is operating in the second phase, further determining whether the actual vehicle speed at the current moment is within a target range determined based on a tolerance range of the target vehicle speed of the vehicle; and in response to that the actual vehicle speed is within the target range, control the vehicle to cruise at a target value of a cruising torque that allows for the speeds fluctuations, wherein the cruising torque is a torque output by an engine of the vehicle from a crankshaft end, and wherein the target value of the cruising torque is determined based on a feedforward torque and a feedback torque, the feedback torque adjusted by a calibration algorithm; or in response to that the actual vehicle speed is not within the target range, adjust the target value of the cruising torque to cause the actual vehicle speed of the vehicle, at a first moment after the current moment, to be within the target range, wherein the vehicle cruise control system determines the target value before the obtaining the actual vehicle speed of the vehicle at the current moment, and wherein the feedforward torque and the feedback torque are respectively: a feedforward torque and a feedback torque of the vehicle control system when a cruise control duration reaches a preset duration in a process in which the vehicle control system controls the vehicle to cruise at the target vehicle speed, the feedforward torque comprises at least one of a gradient resistance torque, a rolling resistance torque, and a wind resistance torque, and the feedback torque comprises a torque required for adjusting the actual vehicle speed to the target vehicle speed.

8. The computer program product according to claim 7, wherein the target range is determined based on the tolerance range of the target vehicle speed and a speed limit range of a road on which the vehicle is located.

9. The computer program product according to claim 8, wherein the target value is a value of a cruising torque at which the vehicle drives on a flat road.

\* \* \* \* \*